(12) United States Patent
Boland

(10) Patent No.: US 8,505,152 B2
(45) Date of Patent: Aug. 13, 2013

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 0 days.

(21) Appl. No.: 13/160,920

(22) Filed: Jun. 15, 2011

(65) Prior Publication Data

US 2011/0239396 A1    Oct. 6, 2011

Related U.S. Application Data

(62) Division of application No. 11/573,065, filed on Feb. 1, 2007, now Pat. No. 7,979,950.

(30) Foreign Application Priority Data

Aug. 3, 2004 (EP) .................................... 04103735

(51) Int. Cl.
*B60S 1/40* (2006.01)

(52) U.S. Cl.
USPC ...................... 15/250.32; 15/250.43; 403/329

(58) Field of Classification Search
USPC ............... 15/250.32, 250.31, 250.43, 250.44, 15/250.351, 250.201; 403/326, 329
See application file for complete search history.

(56) References Cited

U.S. PATENT DOCUMENTS

| | | |
|---|---|---|
| 2,950,134 A | 8/1960 | Strange |
| 2,982,586 A | 5/1961 | Gliebe |
| 4,308,635 A | 1/1982 | Maiocco |
| 4,348,782 A | 9/1982 | Fournier |
| 4,598,438 A | 7/1986 | Egner-Walter et al. |
| 5,531,464 A | 7/1996 | Maurer et al. |
| 7,979,950 B2 * | 7/2011 | Boland ...................... 15/250.32 |

FOREIGN PATENT DOCUMENTS

| | | |
|---|---|---|
| DE | 101 30 903 | 5/2002 |
| EP | 1 403 156 | 3/2004 |
| FR | 2 781 741 | 2/2000 |
| FR | 2 804 923 | 8/2001 |

OTHER PUBLICATIONS

Machine translation of description portion of FR 2781741, published Feb. 2000.*

* cited by examiner

*Primary Examiner* — Gary Graham
(74) *Attorney, Agent, or Firm* — Robert L. Stearns; Dickinson Wright, PLLC

(57) ABSTRACT

A windscreen wiper device comprising an elastic, elongated carrier element, as well as an elongated wiper blade of a flexible material, which can be placed in abutment with a windscreen to be wiped, which wiper blade includes opposing longitudinal groove on its longitudinal sides, in which grooves spaced-apart longitudinal strips of the carrier element are disposed, wherein neighboring ends of said longitudinal strips are interconnected by a respective connection piece, which windscreen wiper device comprises a connecting device for an oscillating arm, wherein said oscillating arm is pivotally connected to said connecting device about a pivot axis near one end, with the interposition of a joint part, wherein said joint part comprises at least one resilient tongue engaging in a correspondingly shaped hole provided in said oscillating arm, and wherein said resilient tongue is rotatable along an hinge axis between an outward position retaining the wiper blade onto the oscillating arm and an inward position releasing the wiper blade form the oscillating arm, characterized in that said resilient tongue is forced in the outward position under the influence of a moment in case a force is exerted on the wiper blade in a direction away from the oscillating arm.

2 Claims, 7 Drawing Sheets

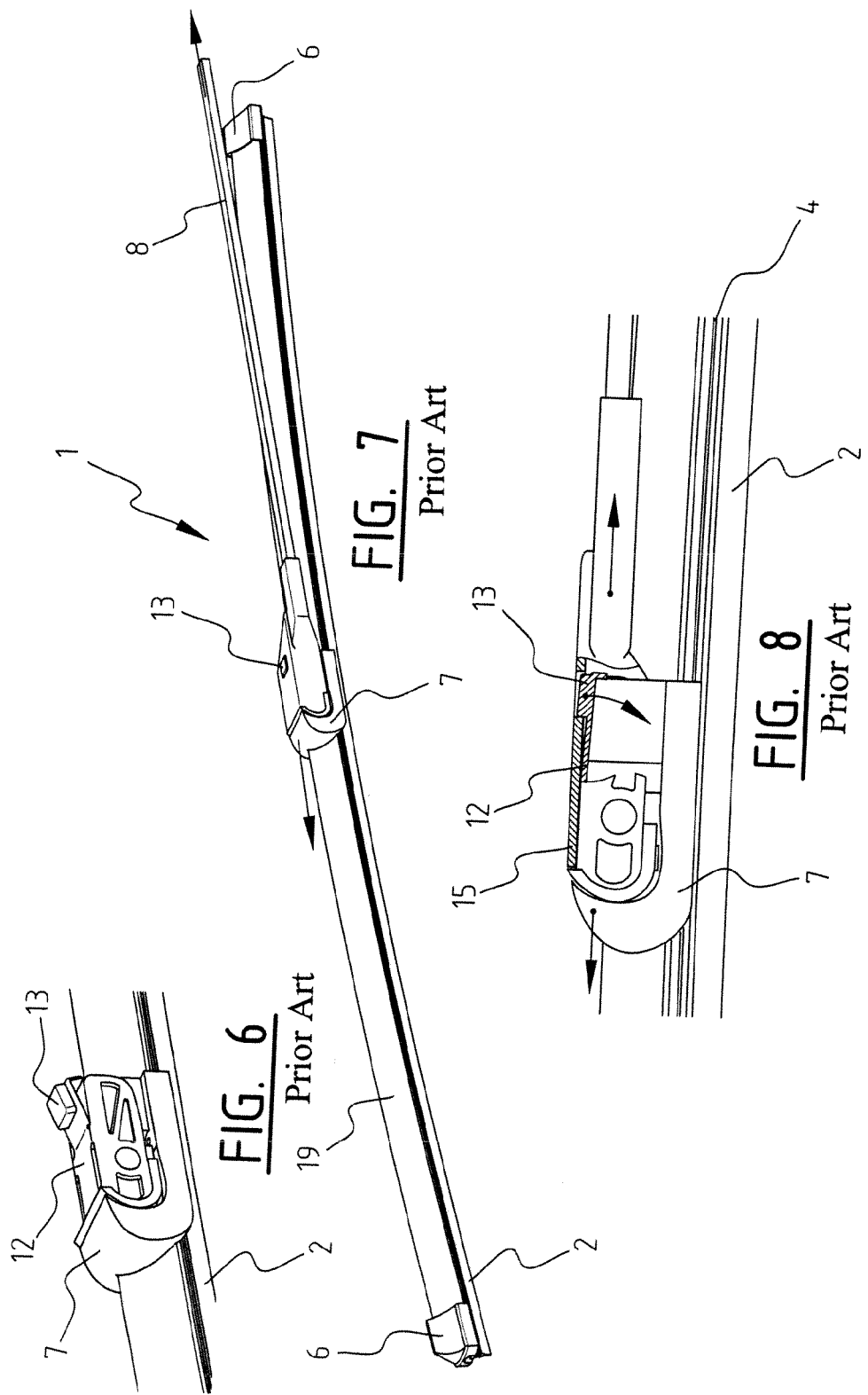

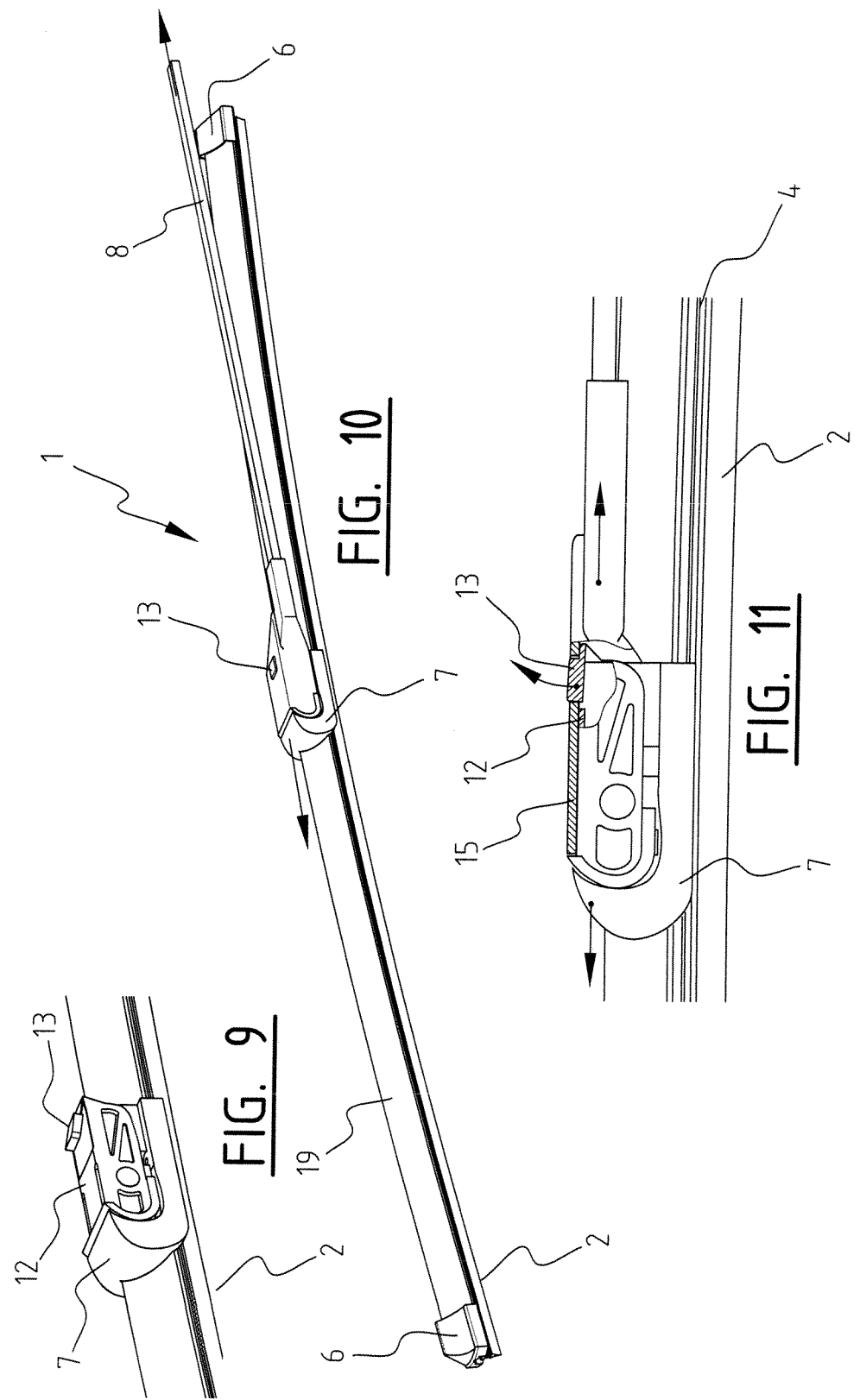

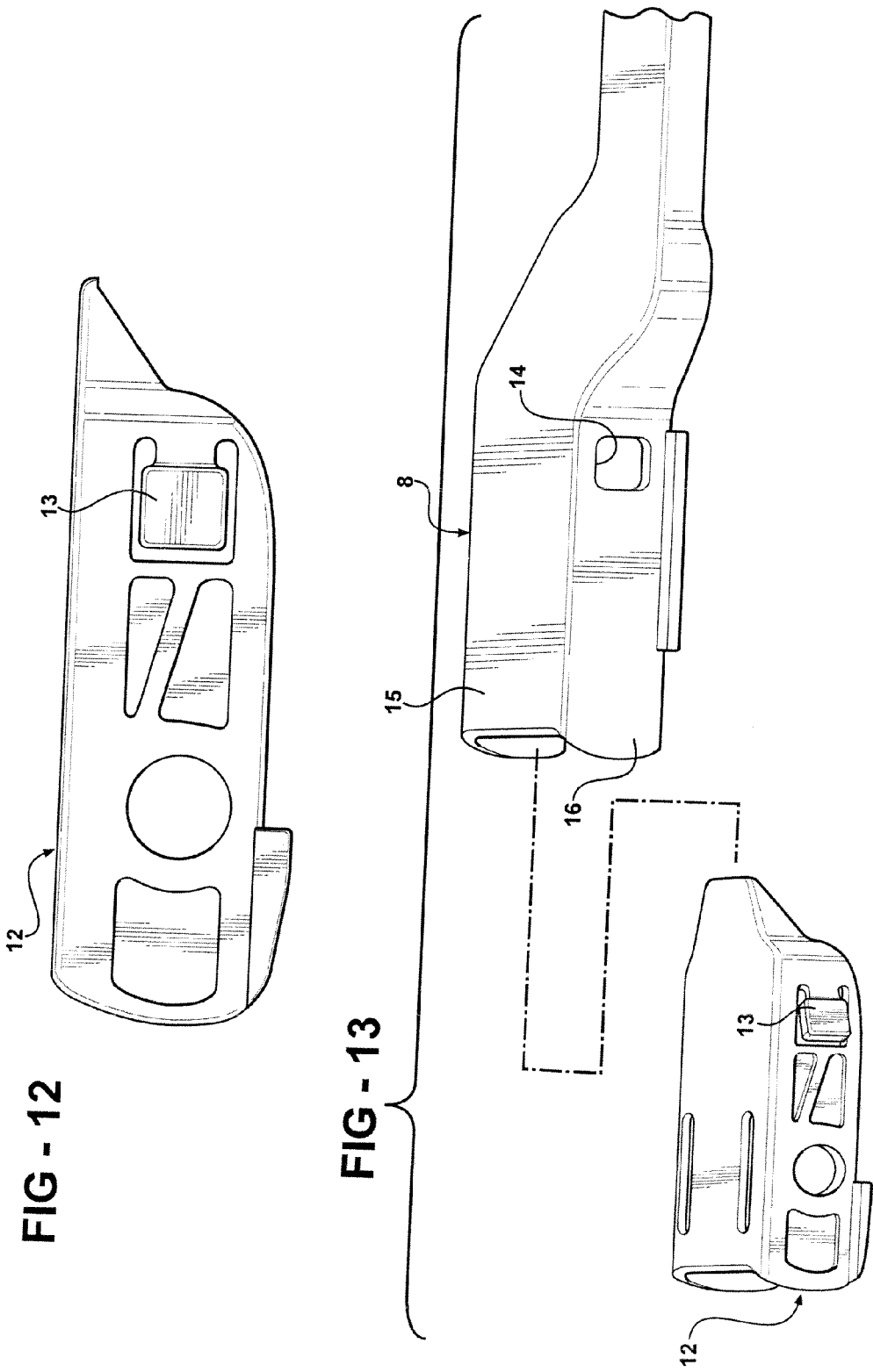

WINDSCREEN WIPER DEVICE

RELATED APPLICATIONS

This is a divisional application which claims priority to U.S. application Ser. No. 11/573,065, filed Feb. 1, 2007 now U.S. Pat. No. 7,979,950, and is incorporated herein by reference.

BACKGROUND OF THE INVENTION

1. Technical Field

The present invention relates to a windscreen wiper device.

2. Related Art

The present invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of said longitudinal strips are interconnected by a respective connecting piece, which windscreen wiper device comprises a connecting device for an oscillating arm, wherein said oscillating arm is pivotally connected to said connecting device about a pivot axis near one end, with the interposition of a joint part, wherein said joint part comprises at least one resilient tongue engaging in a correspondingly shaped hole provided in said oscillating aim, and wherein said resilient tongue is rotatable along an hinge axis between an outward position retaining the wiper blade onto the oscillating arm and an inward position releasing the wiper blade from the oscillating arm.

Such a windscreen wiper device is known from European patent publication no. 1 403 156 of the same Applicant. This prior art windscreen wiper device is designed as a "yokeless" wiper device, wherein no use is made of several yokes pivotally connected to each other, but wherein the wiper blade is biased by the carrier element, as a result of which it exhibits a specific curvature. In order to connect the wiper blade onto the oscillating arm, said resilient tongue is initially pushed in against a spring force—as if it were a push button—and then allowed to spring back into the hole provided in said oscillating arm, thus snapping, that is clipping the resilient tongue into the hole. By subsequently pushing in again said resilient tongue against the spring force, the wiper blade may be released from the oscillating arm.

In practice it has become apparent that, during use of the windscreen wiper device known from the above European patent publication, high forces are exerted on the connection between the connecting device and the oscillating arm. As a consequence thereof the resilient tongue may no longer be in a proper snapped position into the hole of the oscillating min, resulting in play between the connecting device and the oscillating arm. Eventually, the wiper blade may get loose from the oscillating arm.

SUMMARY OF THE INVENTION

The object of the invention is to provide a windscreen wiper device, wherein the connecting device and the oscillating arm are interconnected in an improved manner.

In order to accomplish that objective, a windscreen wiper device of the type referred to in the introduction is characterized according to the invention in that said resilient tongue is forced in the outward position under the influence of a moment in case a force is exerted on the wiper blade in a direction away from the oscillating arm. Particularly, the counterforce exerted by the oscillating arm on the resilient tongue engages at a point located behind the hinge axis, seen in the direction of the force exerted on the wiper blade. In other words, said moment of force ensures in a natural way that the resilient tongue is forced automatically in its outward position, that is its position retaining the wiper blade onto the oscillating arm. On the contrary, in the above-mentioned European patent publication no. 1 403 156 of the same Applicant said moment during use compels the resilient tongue to automatically take its inward position, thereby releasing the wiper blade from the oscillating arm, with all negative consequences involved.

In one preferred embodiment of a windscreen wiper device in accordance with the invention the hinge axis is located near an outer edge of said joint part.

In another preferred embodiment of a windscreen wiper device according to the invention the oscillating arm has an at least substantially U-shaped cross-section at the location of its connection to said joint part, wherein said hole is provided in a base of said U-shaped cross-section. In addition thereto or in the alternative said joint part comprises at least two lateral resilient tongues extending outwardly, wherein the oscillating arm has an at least substantially U-shaped cross-section at the location of its connection to said joint part, and wherein each tongue engages in a correspondingly shaped hole provided in a leg of said U-shaped cross-section.

In another preferred embodiment of a windscreen wiper device in accordance with the invention said hole(s) has/have a closed circumference. Such (a) closed hole(s) enhance (s) the retention of the connection device/joint part onto the oscillating arm in all possible directions, particularly both horizontally and vertically. In the alternative, said hole(s) has/have a non-closed circumference. In another preferred embodiment of a windscreen wiper device according to the invention said joint part is made of plastic (including any synthetic material having some flexibility).

In another preferred embodiment of a windscreen wiper device in accordance with the invention said joint part is attached to said connecting device by pivotally engaging protrusions of said connecting device, at the location of said pivot axis, in recesses provided in said joint part. These protrusions that function as bearing surfaces are spaced far apart, so that the forces exerted thereon will be relatively low.

In another preferred embodiment of a windscreen wiper device according to the invention said joint part has an at least substantially U-shaped cross-section at the location of its attachment to said connecting device, and wherein said joint part in each leg of said U-shaped cross-section is provided with a recess provided coaxially with said pivot axis. Preferably, the protrusions extend outwards on either side of said connecting device, wherein the protrusions are cylindrical. Particularly, the recesses are correspondingly shaped.

BRIEF DESCRIPTION OF THE DRAWINGS

These and other features and advantages of this invention will become more apparent to those skilled in the art from the detailed description of a preferred embodiment. The drawings that accompany the detailed description are described below.

FIGS. 6, 7 and 8 refer to a prior art windscreen wiper device, wherein it is shown how the connecting device may get loose from the oscillating arm;

FIGS. 9, 10 and 11 concern a windscreen wiper device according to the invention showing the improved connection between the connecting device and the oscillating arm; and FIGS. 12 and 13 concern a windscreen wiper device according to an alternative embodiment of the invention.

DETAILED DESCRIPTION OF THE PREFERRED EMBODIMENT

Figure 1:
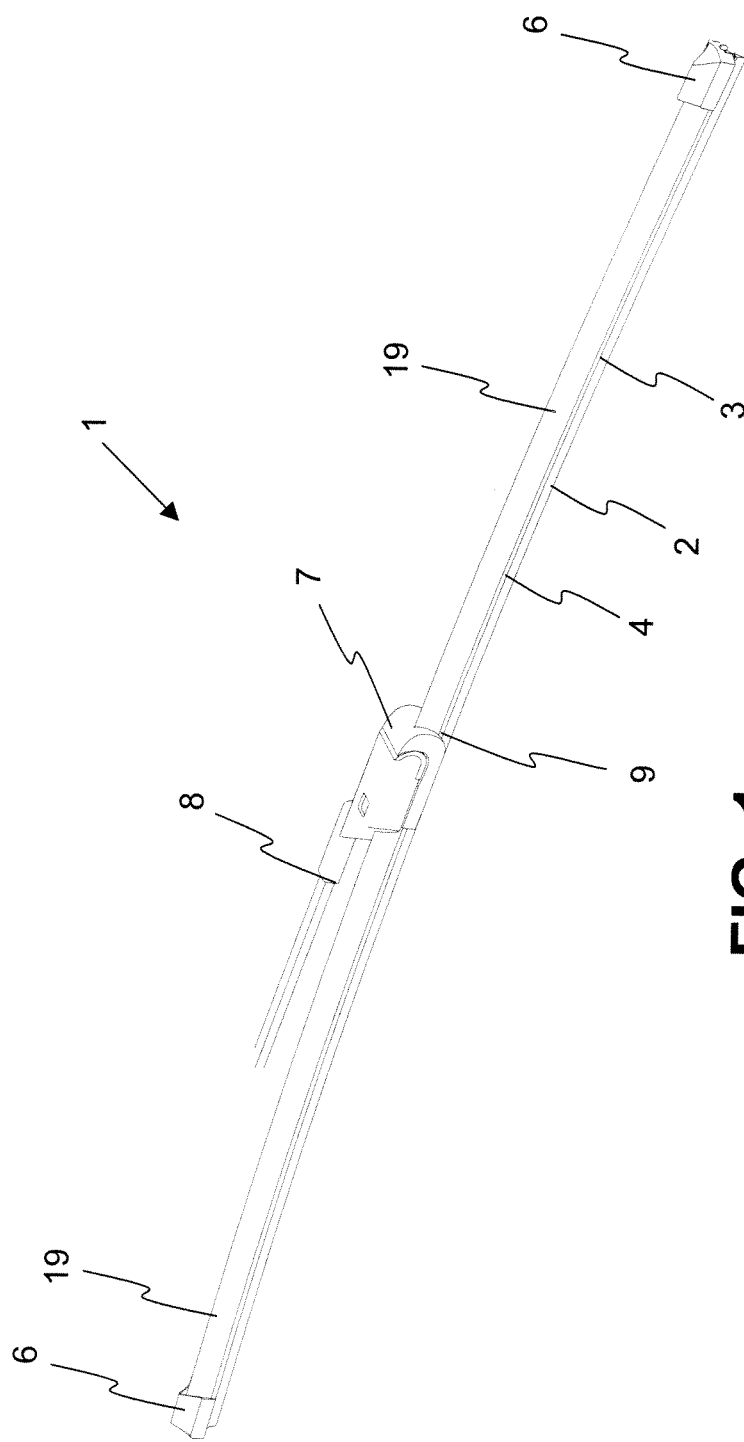
FIG. 1 is a perspective, schematic view of a preferred embodiment of a windscreen wiper device in accordance with the invention.

FIG. 1 shows a preferred variant of a windscreen wiper device 1 according to the invention. Said windscreen wiper device 1 is built up of an elastomeric wiper blade 2, in the longitudinal sides of which opposing longitudinal grooves 3 are formed, and of longitudinal strips 4 made of spring band steel, which are fitted in said longitudinal grooves 3. Said strips 4 form a flexible carrier element for the wiper blade 2, as it were, which is thus biased in a curved position (the curvature in operative position being that of a windscreen to be wiped). Neighbouring ends 5 of the strips 4 are interconnected on either side of the windscreen wiper device 1 by means of connecting pieces 6 functioning as clamping members. In this embodiment, the connecting pieces 6 are separate constructional elements, which may be form-locked ("positive locking" or "having a positive fit") or force-locked to the ends 5 of the strips 4. In another preferred embodiment, said connecting pieces 6 are in one piece with the strips 4 made of spring band steel. In the latter case said connecting pieces 6 fowl transverse bridges for the strips 4, as it were.

The windscreen wiper device 1 is furthermore built up of a connecting device 7 of plastic material for an oscillating arm 8. Alternatively, the connecting device 7 may also be made of metal, such as steel or aluminum. The connecting device 7 comprises clamping members 9 that are integral therewith, which engage round longitudinal sides of the strips 4 that face away from each other, as a result of which the connecting device 7 is firmly attached to the unit consisting of the wiper blade 2 and the strips 4. The oscillating arm 8 is pivotally connected to the connecting device 7 about a pivot axis near one end, as will be described hereunder.

Figure 2:
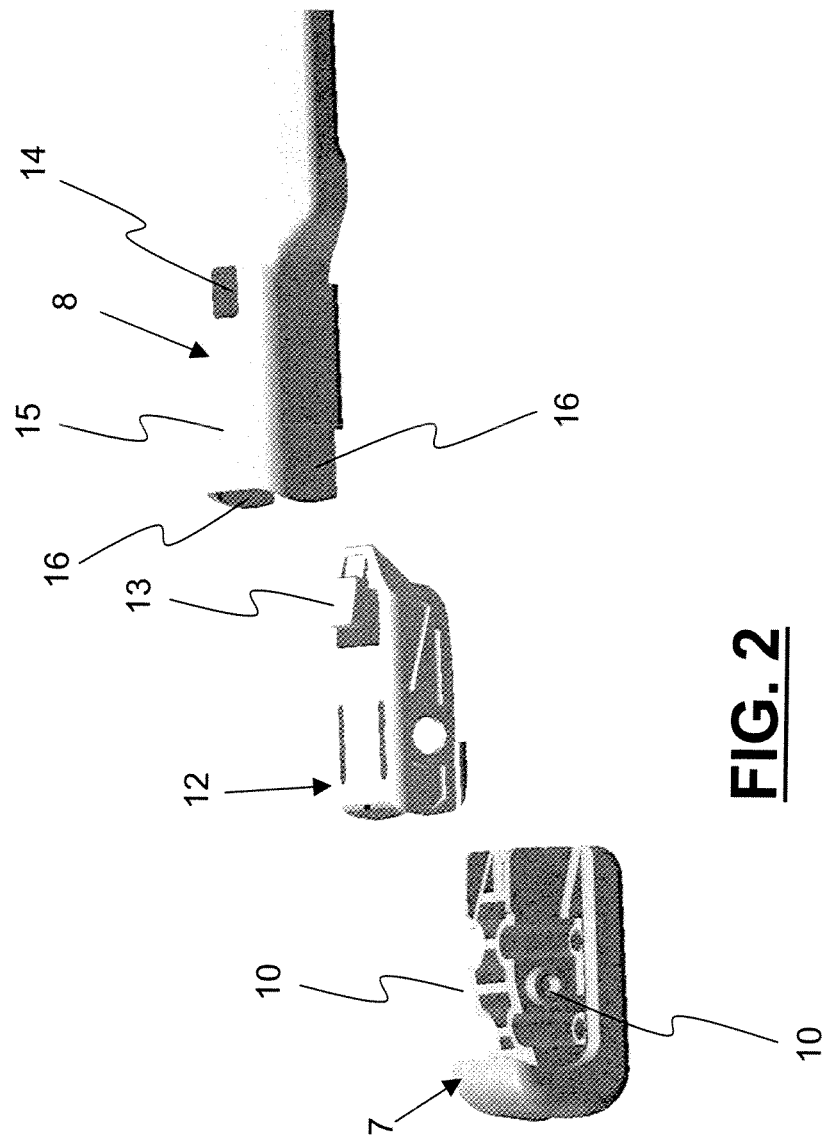
—FIG. 2 is a perspective, schematic view of a connecting device as used in FIG. 1, as well as a joint part and (an end of) a oscillating arm according to another preferred embodiment in accordance with the invention.

With reference to FIG. 2 the connecting device 7 comprises two cylindrical protrusions 10 extending outwards on either side of said connecting device 7. These protrusions 10 pivotally engage in identically shaped cylindrical recesses 11 of a plastic joint part 12. In the alternative the recesses 11 may have a non-closed shape (i.e. open circumference). Said protrusions 10 act as bearing surfaces at the location of a pivot axis in order to pivot the joint part 12 (and the oscillating arm 8 attached thereto) about said pivot axis near one end of the oscillating arm 8. The protrusions 10 are preferably in one piece with the connecting device 7; in the alternative, the protrusions 10 are part of a single pivot pin perpendicular to the connecting device 7. Said connecting device 7 may be equipped with a cover or cap in order to obtain an aesthetic appearance thereof, to avoid sharp edges and to provide protection against UV-light etcetera. The joint part 12 comprises one resilient tongue 13 extending outwardly, while the oscillating arm 8 has an U-shaped cross-section at the location of its connection to said joint part 12, so that the tongue 13 engages in an identically shaped hole 14 provided in a base 15 of said U-shaped cross-section.

Figure 3A:
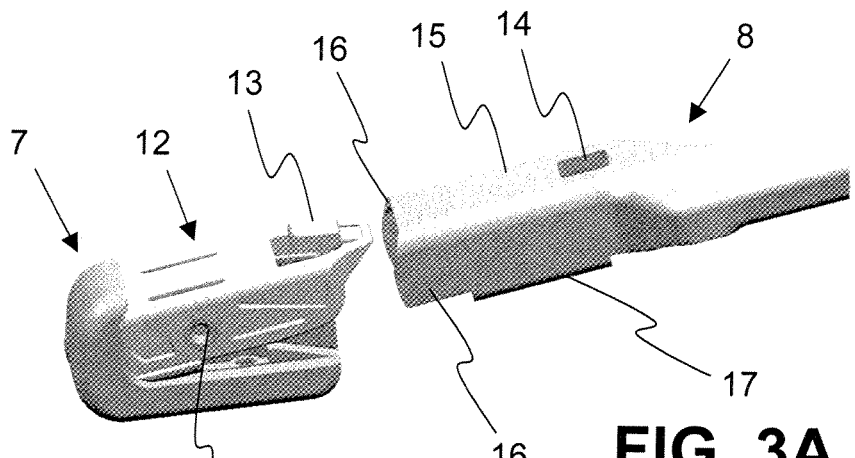
FIG. 3 shows various successive steps for fitting the connecting device, the joint part and the oscillating arm of FIG. 2 together.
Figure 3B:
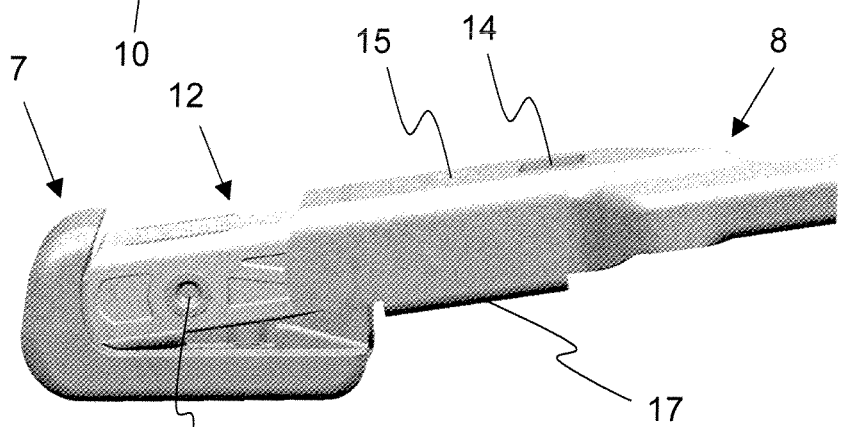
Figure 3C:
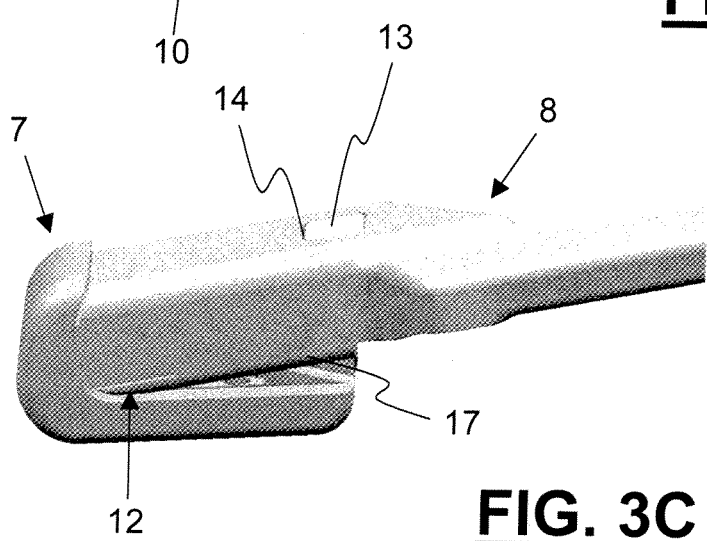

FIG. 3 shows the steps of mounting the connecting device 7 with the wiper blade 2 (not shown) onto the oscillating arm 8. The joint part 12 being already clipped onto the connecting device 7 is pivoted relative to the connecting device 7, so that said joint part 12 can be easily slid on a free end of the oscillating arm 8. During this sliding movement the resilient tongue 13 is initially pushed in against a spring force and then allowed to spring back into said hole 14, thus snapping, that is clipping the resilient tongue 13 into the hole 14. This is a so-called bayonet-connection. The oscillating arm 8 together with the joint part 12 may then be pivoted back in a position parallel to the wiper blade 2 in order to be ready for use. By subsequently pushing in again said resilient tongue 13 against the spring force (as if it were a push button), the connecting device 7 and the joint part 2 together with the wiper blade 2 (not shown) may be released from the oscillating arm 8. Dismounting the connecting device 7 with the wiper blade 2 (not shown) from the oscillating arm 8 is thus realized by sliding the connecting device 7 and the joint part 2 together with the wiper blade 2 (not shown) in a direction away from the oscillating arm 8.

Each leg 16 of the U-shaped cross-section of the oscillating arm 8 comprises clamping members formed as inwardly bended edges 17 integral with said legs 16, wherein during use said edges 17 engage round longitudinal sides of said joint part 12 that face away from each other. Thus an enhanced retention of the connecting device 7/joint part 12 onto the oscillating arm 8 is achieved in vertical direction, that is perpendicular to the longitudinal direction of the oscillating aim 8.

Figure 4:
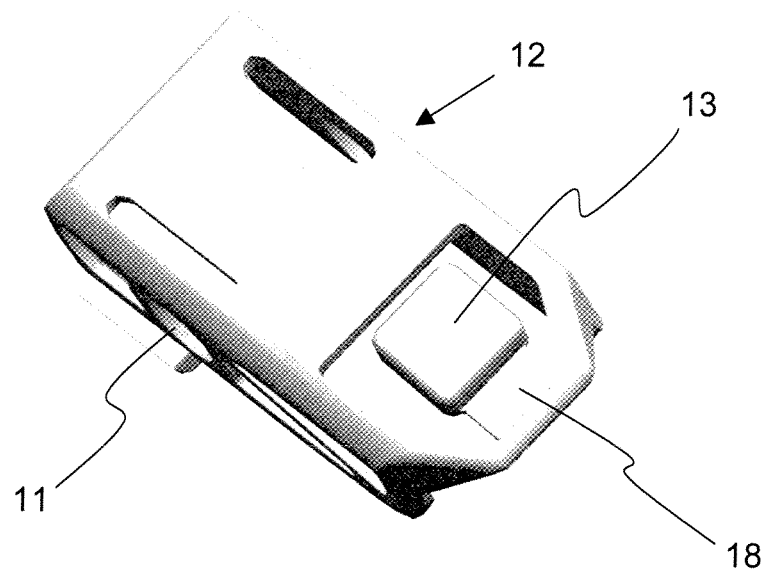
FIGS. 4 and 5 relate to several views of a joint part of FIGS. 2 and 3.
Figure 5:
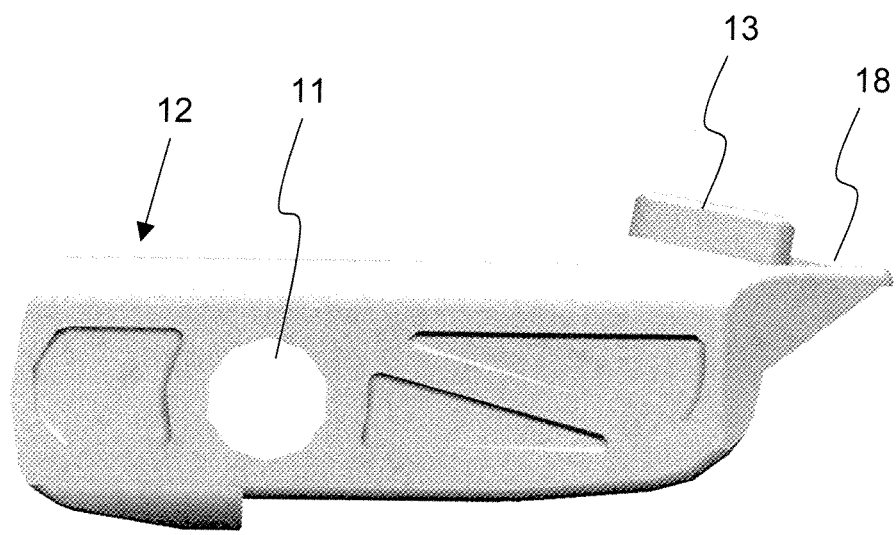

FIGS. 4 and 5 relate to several views of a joint part of FIGS. 2 and 3. Said resilient tongue 13 is rotatable along an hinge axis 18 (located near an outer edge of said joint part 12) between an outward position retaining the wiper blade 2 onto the oscillating arm 8 and an inward position releasing the wiper blade 2 from the oscillating arm 8. According to an essential feature of the invention said resilient tongue 13 is forced in the outward position under the influence of a moment in case a force is exerted on the wiper blade 2 in a direction away from the oscillating arm 8. Particularly, the counterforce exerted by the oscillating arm 8 on the resilient tongue 13 engages at a point located behind the hinge axis 18, seen in the direction of the force exerted on the wiper blade 2. In other words, said moment of force ensures in a natural way that the resilient tongue 13 is forced automatically in its outward position, that is its position retaining the connecting device 7, the joint part 12 and the wiper blade 2 (not shown) onto the oscillating arm 8.

In FIGS. 6, 7 and 8 a windscreen wiper device according to the prior art, for example of the type is described in European patent publication no. 1 403 156 indicated earlier, is shown, wherein corresponding parts have been designated by the same reference numbers. In case a force is exerted on the wiper blade 2 in a direction of the arrow of FIG. 7, the counter force exerted by the oscillating arm 8 may cause the resilient tongue 13 to be pushed inwardly, so that the wiper blade 2 may get loose from the oscillating arm 8 (see FIG. 8).

As can be seen in FIGS. 9, 10 and 11 corresponding to FIGS. 6, 7 and 8, respectively, the counterforce exerted by the oscillating arm 8 as mentioned above automatically forces the resilient tongue 13 in the outward position, thereby retaining the wiper blade 2 on the oscillating arm 8 (FIG. 11).

Possibly, a spoiler 19 is furthermore provided (FIG. 1).

FIGS. 12 and 13 depict an alternative embodiment of the invention, wherein the joint part 12 comprises at least two lateral resilient tongues 13 extending outwardly. Each tongue 13 engages in a correspondingly shaped hole 14 provided in each leg 16 of its u-shaped cross-section.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

I claim:

1. A windscreen wiper comprising:

a longitudinally extending wiper element and support structure supporting said wiper element;

a generally u-shaped joint part pivotally connected to said support structure for relative pivotal movement about a pivot axis transverse to said longitudinal direction of said wiper element;

said joint part including a top wall, two side walls, an open bottom and opposite longitudinal ends spaced from said pivot axis;

said joint part including at least one resilient latching tongue formed in at least one of said walls having an integral hinge adjacent one of said ends and extending therefrom to an opposite free end of said tongue; and wherein said free end of said resilient tongue is disposed longitudinally between said hinge axis of said tongue and said pivot axis of said joint part and each of said free end and said integral hinge are arranged closer to said one end than they are to said pivot axis.

2. A windscreen wiper comprising:

a longitudinally extending wiper element and support structure supporting said wiper element said support structure being in the form of at least one spring elastic band of metal pre-shaped to impart a curvature to the wiper element when in a relaxed state but elastically flexible to enable the wiper element to conform to the shape of a windscreen to be wiped;

a joint part pivotally connected to said support structure for relative pivotal movement about a pivot axis transverse to said longitudinal direction of said wiper element;

said joint part being generally u-shaped and having a top wall, two side walls and an open bottom and including opposite longitudinal ends spaced from said pivot axis;

said joint part including at least one resilient latching tongue having an integral hinge adjacent one of said ends and extending therefrom to an opposite free end of said tongue in a direction toward the opposite end of said joint part; and wherein said free end and said integral hinge of said latching tongue are each arranged closer to said one end than they are to said pivot axis.

* * * * *